3,743,604
PROCESS FOR THE PRODUCTION OF
MICROCAPSULES
Hildegard Schnoring, Wuppertal-Elberfeld, and Nikolaus Schon, Leverkusen, Germany, assignors to Bayer Aktiengesellschaft, Leverkusen, Germany
No Drawing. Continuation of abandoned application Ser. No. 886,028, Dec. 17, 1969. This application Aug. 23, 1971, Ser. No. 174,147
Claims priority, application Germany, Jan. 9, 1969, P 19 00 865.2
Int. Cl. B01j 13/02; B44d 1/02
U.S. Cl. 252—316                                  1 Claim

ABSTRACT OF THE DISCLOSURE

Method for producing microcapsules wherein a solution of a water-soluble polymer containing acid and base groups and a solution of a water-soluble polymer containing carboxyl- or carboxylate groups are purified by means of an ion-exchanger and wherein a material which forms the core of the microcapsules is dispersed in one of said solutions prior to mixing the solution. Upon mixing the solutions, spontaneous coacervation occurs without the necessity of lowering the temperature. The water-soluble polymers used are gelatin and gum arabic.

CROSS REFERENCE TO RELATED APPLICATION

This application is a continuation of Ser. No. 886,028, filed Dec. 17, 1969, now abandoned.

It is known that microcapsules can be produced by complex coacervation. These capsules contain liquids, solids, emulsions or suspensions and have a shell of high molecular weight material. The material which is present inside the microcapsules is generally referred to hereinafter as the core material or core substance, whilst the shell is referred to as the shell material or shell substance. Microcapsules of this kind can be produced by depositing the shell substance from aqueous solution, which may be colloidal, on to the core material dispersed in this solution.

For this purpose, a dispersion (for example an emulsion or suspension) is prepared initially from the required core material and colloidal solutions of the shell substance. Coacervation is then initiated with the coacervate, i.e. with the colloid-rich phase or the shell substance, being precipitated from the continuous phase of the dispersion and deposited around the non-continuous phase, i.e. the core material. Deposition of the coacervate around the non-continuous phase is always caused by the fact that the individual particles represent inhomogeneities in the continum of the collodial solution and accordingly act as condensation seeds or nuclei for the precipitation of the colloid-rich phase, the coacervate. Whether or not a continuous coacervate shell is formed round the individual particles depends on the water content and/or on the temperature of the coacervate which is being precipitated. A high water content and/or high temperature imparts fluency to the coacervate thus enabling it to flow around the condensation nucleus, i.e. to envelop the dispersed core material. In other words, the dispersed core material is always easier to encapsulate at elevated temperature. Accordingly, conventional processes for encasing a core material by complex coacervation mainly differ from each other in the methods by which the dispersion of the core material and the hydrophilic colloidal solution mixture is caused to coacervate.

It is known that emulsions or suspensions can be prepared from any required core material, for example oil or pigment, and the colloidal polymer solution having a sufficiently high colloidal solution concentration so that dilution with water promotes coacervation of the hydrophilic colloids from the continuous phase of the emulsion or suspension and that the coacervate is deposited around the disperse phase. In order to achieve this, dilution has to be carried out at elevated temperature. The colloid concentration at which coacervation occurs by dilution is extremely low. In the case of the gelatin/gum arabic system, it is around 1%, beyond 2% coacervation may well not occur.

It is also known that an emulsion or suspension can be prepared from the required core material, for example oil or pigment, and the colloidal solutions of the shell substance in the presence of bases. When the pH value is reduced by the addition of acids, the hydrophilic colloids are deposited as the coacervate from the continuous phase of the emulsion or suspension around the disperse phase, thus enveloping it, so that capsules with initially still liquid walls are formed, their equilibrium liquid being an aqueous, salt-containing solution of low colloid content.

In conventional processes, the coacervate envelops the disperse phase more effectively, the more slowly and uniformly the system is converted into the coacervate range, i.e. the more slowly reduction of the pH value or dilution is carried out. Accordingly, special processes are available for the production of microcapsules by complex coacervation which are concerned solely with a uniform and gradual reduction of the pH value by the addition of acids or uniform gradual dilution with water (over a period of e.g. two hours) and in which the system is intensively stirred during this period (cf. DAS 1,122,495).

A process for the production of microcapsules has now been found in which the microcapsules consist of an encased core material and a shell of a complex coacervate of:

(A) a water-soluble polymer containing acidic and basic groups,
(B) a water-soluble polymer containing carboxyl or carboxylate groups, in which an aqueous solution of (A) and/or an aqueous solution of (B) is passed through an ion exchanger or an ion exchanger mixture, the core material is dispersed in the solution of (A) or (B) either before or after this treatment, after which the solutions are mixed together.

The tedious time-consuming conversion into the coacervate range can thus be avoided and spontaneous coacervation, resulting in envelopment of the disperse phase, can be achieved. The solutions may be contacted either individually or in admixture with ion exchangers. The anions and/or cations and, in some cases, even foreign salts which are present in the solutions are replaced by H- or OH-ions so that substantially salt-free solutions of the components (A) and (B) are obtained. If anion and cation exchangers are used in excess, i.e. if exchangers are present in such a quantity that their exchange capacity is greater than necessary for the ions present in the solutions, each solution is automatically adjusted to a constant pH value specific to it. A solution of a hydrophilic ampholyte for example, gelatin, is thus spontaneously adjusted to its isoelectric point and an anolyte or catholyte solution to the pH value at which the molecules show a maximum rate of migration in an electric field.

Any other pH value required may also be reproducibly adjusted by suitable selection of the type of ion exchanger and its quantity.

These substantially salt-free solutions coacervate particularly easily. If, for example, a gelatin solution which has been desalted by ion exchangers is combined with a gum arabic solution which also has been desalted by ion exchangers, spontaneous coacervation occurs, even if the solutions are very concentrated. The solutions may have a polymer concentration, for example, of up to 10%, i.e. their concentration is of the order normally used for starting coacervation by gradual dilution (to a concentration of about 1 to 2%) with continuous stirring (dilution coacervation).

In the process according to the invention, the shell is formed by reacting two macromolecular components in aqueous solution, one component (A) constituting a water-soluble polymer containing acid and basic groups, and the other component (B) being a synthetic or natural water-soluble polymer containing carboxyl and/or carboxylate groups. Amphoteric polymers such as proteins, for example casein, albumin and preferably gelatin, are particularly suitable for use as the water-soluble polymer (A) containing acid and basic groups.

Examples of suitable synthetic water-soluble polymers (B) include reaction products of copolymers of maleic anhydride containing, for example, ethylene, styrene, isobutylene, vinyl ether as comonomer, and copolymers of acrylic acid and methacrylic acid with acrylamide or (meth)-acrylic esters as comonomer, their salts and also carboxymethyl cellulose. Reaction products of maleic anhydride copolymers are products of the kind obtained by reacting the acid anhydride group with water, ammonia, amines or diamines containing a tertiary amino group, aminoalcohols or metal hydroxides and so on. Examples of natural water-soluble polymers (B) containing carboxyl or carboxylate groups include gum arabic, alginic acid and alginates and pectins.

In general, hydrophobic finely-divided organic or inorganic solid or liquid substances are suitable for use as core materials in the process according to the invention. Of the many possibilities, the following are given purely by way of example: pharmaceutical preparations and plant-protection agents, foodstuffs and food additives (for example spices, aromatic substances), dyes (for example inorganic and organic pigments), chemicals, lubricants and other oils.

The core materials may also be encapsulated in the form of organic solutions. It is also possible to encapsulate hydrophilic core materials providing they have been dispersed in a hydrophobic medium.

In general, water is used as solvent for the shell materials, although mixtures of water with alcohols or acetone may also be used.

The components (A) and (B) used for coacervation are employed in concentrations of from 1% to 10%, based on the aqueous solutions.

From 0.1 to 2 parts of shell material are used to 1 part of core materials, depending both upon the particle size of the core material and the required shell thickness.

The process can be carried out in several different ways. Thus, the core material may be dispersed in the solution of component (A) or in the corresponding solution of component (B), either before or after the solutions have been treated with the ion exchangers. Depending upon the type of core material used, it may be necessary to add dispersion assistants such as, for example, the conventional dispersion or emulsification agents and stabilisers. In general, however, the core materials can be readily dispersed in the solutions of (A) and/or (B) in the absence of auxiliaries.

For the treatment with the ion exchangers, the solutions of components (A) and (B) or their mixtures, if desired, containing the core material in dispersed form, should be at temperatures at which free-flowing solutions are formed. As a rule, temperatures of from 10 to 80° C. are used.

Treatment with the ion exchangers is generally carried out in the conventional manner, i.e. by passing the solutions through columns containing ion-exchange resins. In the present case, it is preferred to use solid resinous ion exchangers, preferably strongly acid or strongly basic ion exchangers based on polymers. Cross-linked polystyrenes containing sulphonic acid groups or tertiary amino or quaternary ammonium groups are particularly suitable. In other words, it is possible to use both cation and anion exchangers, especially strongly acid or strongly basic exchangers. They are generally used in the hydrogen or hydroxyl forms. In principle, it is possible to use any strongly basic and strongly acid ion exchangers, i.e. including those based on condensation products. It is even possible to use so-called liquid ion exchangers.

In general, the ion exchangers are used in a so-called mixed bed. In this case, the solution to be treated is allowed to flow through a mixture of a strongly acid cation and a strongly basic anion exchanger. The ratio in which these two exchangers are mixed can be adjusted to meet particular requirements.

A mixed bed of this kind is employed particularly for the treatment of component (A) and for the treatment of mixtures of solutions of components (A) and (B). Solutions of component (B) alone may also be treated in the mixed bed. However, it may also be sufficient, particularly where synthetic polymers are used, for example of the type containing carboxylate groups, to use only a cation exchanger. In the case of synthetic polymers containing carboxyl groups, it is also possible to forego the treatment with cation exchangers providing the pH value of these solutions, from their preparation, is in the range favourable for coacervation.

Coacervation occurs spontaneously when the solutions of components (A) and (B) containing the core material and treated with the ion exchangers are mixed together.

The process according to the invention can be carried out particularly easily by passing one of the two solutions of the shell material, if desired after treatment in the ion exchanger column, together with the core material to be dispersed through a dispersion machine and using the high rate of flow of the issuing dispersion for mixing with the solution of the second component of the shell material. It may be desirable in order to obtain a good emulsion to add to the core material emulsifiers or emulsification auxiliaries or aqueous solutions thereof.

However, the dispersion and the solution of the second component of the shell material may also be continuously contacted, for example, by delivering both solutions through a pump so that they are intensively mixed in the pump itself. Basically, however, any other type of intensive mixing may be applied.

Combining of the two polymer solutions A and B can be effected at any suitable temperature, preferably at a temperature of between about 0 and 100° C., most preferably at 10 to 40° C.

The mixture which actually begins to coacervate on contact can also be passed, for example, through a tempered packed column.

Coacervation is complete after only a few minutes to such an extent that the microcapsules may, if desired, be after-treated in the aqueous solutions containing the microcapsules in dispersed form. A packed column is especially suitable to control the temperature of the solutions, effectively within the range suitable for coacervation. In this context, after-treatment means, for example, hardening of the microcapsules, using the reactions commonly used for hardening gelatin such as, for example, cross-linking with formaldehyde, dialdehydes or other cross-linking agents or with polyvalent ions. It is also possible to provide the microcapsules with a second shell, for example, by a subsequent coacervation stage. The particle sizes of the microcapsules are largely governed by the degree of dispersion of the core material and hence, in the case of solids, by their grain size and, in the case of liquids, by their droplet size which is adjusted when they are dispersed in the solution of (A) or (B) or (A) and (B). Accordingly, the particle sizes of the microcapsules can be varied within wide limits, although particle sizes of from 5 to 200μ are normally used. The particle sizes of the microcapsules are also governed by the ratio of shell material to core material or its surface.

To isolate the microcapsules, the reaction medium is, if desired, diluted, cooled and freed from the microcapsules by filtration, centrifuging or by means of a cyclone separator. The microcapsules can then be washed and dried by conventional methods in spray dryers or flash dryers, in a fluidised bed and, if desired, at reduced pressure.

EXAMPLE 1

A 5% aqueous gelatin solution is prepared using gelatin obtained from alkaline-limed pigskin. This solution has a pH value of 5.7 and a conductivity of 1630 μs. This solution is passed through an ion exchanger column heated to 60° C. with 1 part by volume of a strongly acid cation exchanger (copolymer of a styrene and 8% of divinylbenzene with sulphonic acid groups) and two parts by volume of a strongly basic anion exchanger (copolymer of styrene and 8% of dinvylbenzene with quaternary ammonium groups) in the H- and OH-form, respectively. On leaving the column the solution has a pH value of 8.6 and a conductivity of 7.5 μs. and is run off through a heated discharge pipe.

A 5% aqueous solution of gum arabic is also prepared. This solution has a pH value of 5.1 and a conductivity of 860 μs. It is also passed through an ion exchanger column containing one part by volume of the above-mentioned cation exchanger and one part by volume of the anion exchanger, again using the H- and OH-forms, respectively. On leaving the column, the solution has a pH value of 2.4 and a conductivity of 150 μs.

Polybutene oil (viscosity 60 cp.) is continuously emulsified into the gum arabic solution issuing from the column by means of an emulsifying machine such as a Bosch pump or Supraton, in such a quantity that a 40% oil-in-water emulsion is formed. This emulsion is at a temperature of 60° C. The emulsion continuously issuing from the emulsifying machine is introduced into the same discharge pipe heated to 60° C. as the gelatin solution. Coacervate shells are formed around the droplets of polybutadiene oil when the two solutions are combined. The stream of liquid issuing from the discharge pipe, containing the encapsulated oil, is then cooled in a packed column kept at 20° C. in order to solidify the shells and these can then be chemically after-treated, for example, they can be hardened. After drying, a powder is obtained which consists of particles having a diameter of from 50 to 100μ. Repeating this procedure but leaving off the de-ionisation step results in no coacervation.

EXAMPLE 2

The solutions mentioned in Example 1 are again prepared and treated in the same way with ion exchangers. In this case, however, 50% by volume of lemon oil are emulsified into the stream of gelatin issuing from the column, after which the two streams of liquid are introduced into the common discharge pipe, as a result of which the droplets of lemon oil become covered with a coacervate shell.

EXAMPLE 3

A 10% aqueous gelatin solution is prepared using gelatin obtained from acid-limed pigskin. The solution has a pH value of 6.2 and a conductivity of 825 μs. This solution is passed through a packed column heated to 60° C. as described in Example 1. On leaving the column, it has a pH value of 4.9, corresponding to its isoelectric point, and a conductivity of 3.5 μs. This gelatin solution issuing from the column is mixed with a 30% dispersion of $TiO_2$ in silicone oil so that an aqueous 25% emulsion with pigment-containing silicone oil is formed.

This emulsion is then introduced into an 2% aqueous solution of polygalacturonic acid heated to 60° C. After cooling, by passing through a packed column, an encapsulated product with spherical diameters of from 20 to 120μ is obtained.

EXAMPLE 4

A 2% aqueous polymanuronic acid solution is passed through a mixed bed ion exchanger heated to 40° C., of one part by volume of the cation exchanger already mentioned in Example 1 and one part by volume of the anion exchanger mentioned in Example 1, and is then continuously combined with the pigment-containing silicone oil emulsion prepared in accordance with Example 3. An encapsulated product is again formed which can be after-treated and, if desired, provided with a second shell which is completely separate from the first shell.

EXAMPLE 5

An aqueous solution is prepared from 5% of gelatin and 5% of gum arabic. 10% of iron oxide is dispersed in this solution which is then passed through an ion exchanger mixed bed heated to 70° C. as described in Example 1 (ratio by volume 1:1). Coacervation begins in the column so that the individual pigment particles are encapsulated. The pH value of the issuing capsule paste suspension is 3.9 and its conductivity 2.3 μs. The product issuing from the column is introduced into water at 20° C. so that the shells solidify. Pigment particles from 0.5 to 5μ in diameter are formed. To harden the shell, the particles are mixed with 1% of formaldehyde in solution and the resulting mixture stirred for 2 hours. The capsules are then separated by centrifuging and dried at 60° C., giving a free-flowing pigment powder.

EXAMPLE 6

A 1% solution of an ethylene/maleic acid copolymer was prepared by stirring ethylene/maleic anhydride copolymer (MW 300,000) into water at 95 C. until a clear solution was formed (about 1 hour). 10 parts of castor oil are dispersed in 100 parts of this solution with stirring at 20° C. so that droplets 20 to 50μ in diameter were formed. A 7% gelatin solution was passed through an ion exchanger mixed bed as described in Example 1. Both solutions were heated to 50° C. and equal parts of the oil dispersion were sprayed into the gelatin solution so that quick admixture occurred. Coacervation began immediately, covering the oil droplets with a shell. The reaction medium was passed through a packed column kept at 30° C. The average residence time in the column was three minutes. The issuing reaction medium was mixed with 1% of formaldehyde and, after 20 minutes, was cooled to 10° C. The microcapsules were centrifuged off and dried at 50° C., leaving a free-flowing powder (capsule diameter 40 to 80μ).

What is claimed is:

1. A process for producing microcapsules consisting of an encased core material and a shell of a complex coacervate which comprises (1) passing a 1 to 10% by weight aqueous solution of gelatine over an excess of a mixture of an anion exchanger and a cation exchanger, (2) passing a 1 to 10% by weight aqueous solution of gum-arabic over an excess of a mixture of an anion exchanger and a cation exchanger, the result in both instances being to remove cations and anions other than hydrogen and hydroxyl and to adjust aqueous solutions (1) and (2) to their isoelectric point, (3) dispersing a core material in solution (1) or solution (2), and (4) mixing solutions (1) and (2) in substantially equivalent amounts at a temperature of 0 to 100° C., whereby spontaneous coacervation occurs without the necessity of lowering the temperature.

(References on following page)

References Cited

UNITED STATES PATENTS

| | | | |
|---|---|---|---|
| 2,800,457 | 7/1957 | Green et al. | 252—316 |
| 3,317,434 | 5/1967 | Veis et al. | 252—316 |
| 3,043,782 | 7/1962 | Jensen | 252—316 |

RICHARD D. LOVERING, Primary Examiner

U.S. Cl. X.R.

99—140 R, 166; 106—300, 304, 308 C, 308 M, 308 N, 308 P, 308 Q; 117—100 A, 100 B; 264—4; 424—33, 34, 35, 36, 37